Feb. 27, 1962 T. L. FAWICK 3,022,877
ASSEMBLY FOR CLUTCHES AND BRAKES
Filed Jan. 19, 1959 2 Sheets-Sheet 1
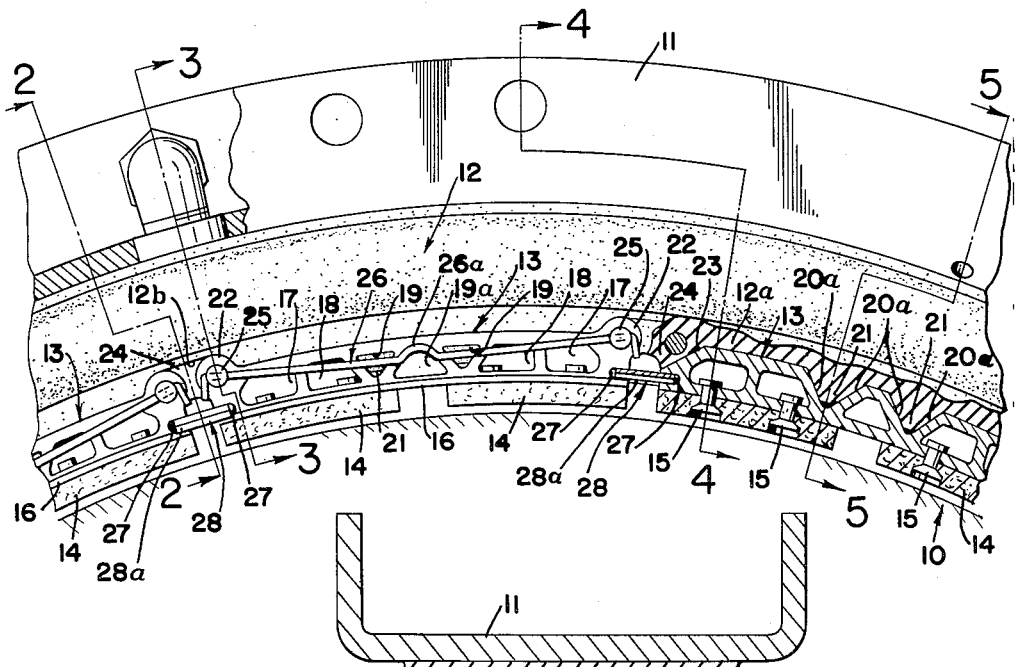
FIG. 1
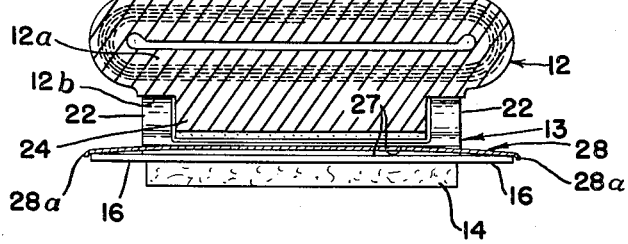
FIG. 2
FIG. 3
INVENTOR.
THOMAS L. FAWICK
BY Willard D. Eakin
ATTORNEY Feb. 27, 1962 T. L. FAWICK 3,022,877
ASSEMBLY FOR CLUTCHES AND BRAKES
Filed Jan. 19, 1959 2 Sheets-Sheet 2

INVENTOR.
THOMAS L. FAWICK
BY Willard D. Eakin
ATTORNEY

United States Patent Office 3,022,877
Patented Feb. 27, 1962

3,022,877
ASSEMBLY FOR CLUTCHES AND BRAKES
Thomas L. Fawick, Cleveland, Ohio, assignor to Fawick Corporation, a corporation of Michigan
Filed Jan. 19, 1959, Ser. No. 787,487
1 Claim. (Cl. 192—88)

This invention relates to a clutch or a brake comprising a drum, a set of circumferentially arranged wear-shoes and an annular, fluid-extensible diaphragm for radially actuating the shoes.

Its chief objects are to provide an assembly having improved means for bridging the space between adjacent shoes to protect a burnable diaphragm from sparks created by frictional contact of the shoes with the drum; to provide simplicity, economy and durability of construction; and to provide facility of replacement and repair.

Of the accompanying drawings:

FIG. 1 is a fragmentary elevation, with parts sectioned and broken away, of an assembly embodying my invention in its preferred form.

Figure 4:
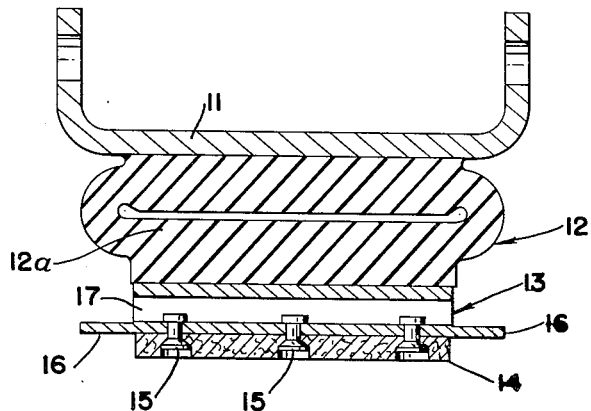
Figure 5:
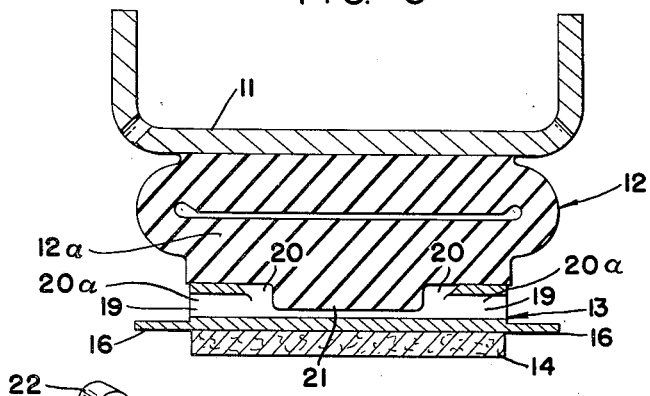
Figure 6:
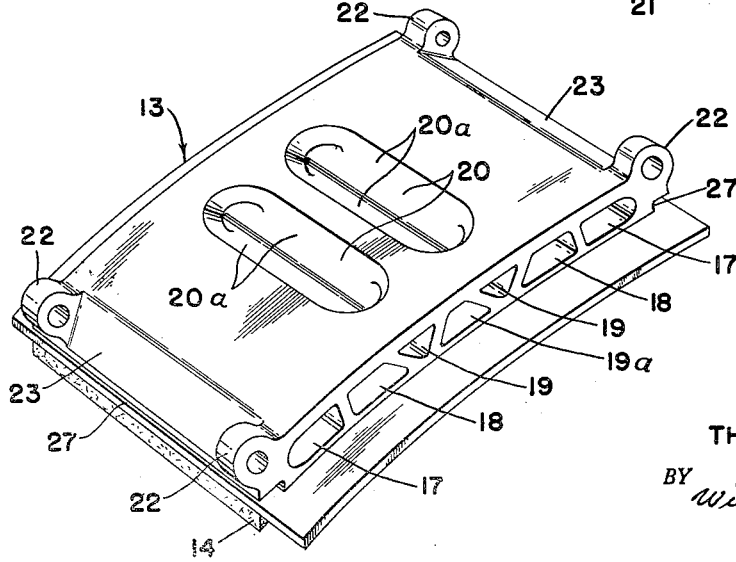

FIG. 2 is a section on line 2—2 of FIG. 1.
FIG. 3 is a section on line 3—3 of FIG. 1.
FIG. 4 is a section on line 4—4 of FIG. 1.
FIG. 5 is a section on line 5—5 of FIG. 1.
FIG. 6 is a perspective view of one of the wear-shoe base members.

The drawings show the invention as applied to a clutch of the constricting type, in which it fulfills specific needs that are incident to the presence of centrifugal force in the shoe assemblies and the diaphragm, and the vulnerability of the rubber-surfaced diaphragm to be burned by sparks because of the fanning effect of the diaphragm's rotation.

The assembly comprises a clutch-drum 10, FIG. 1, a base ring 11 of the usual channel form, a hollow, annular diaphragm 12, primarily of rubber, secured to the inner face of the base ring 11 as by vulcanized adhesion and having at its inner periphery a thick rubber wall 12a specially shaped for interlocking with a set of circumferentially spaced wear-shoe assemblies. Each of the said assemblies comprises a base member 13, preferably of extruded aluminum alloy, and one or more blocks of frictional material such as the blocks 14, 14, FIG. 1, secured to the base member 13 by rivets 15, 15.

Each of the base members 13 comprises an imperforate, plate-like portion 16 to which the blocks 14 are riveted and, integral therewith but of narrower width axially of the assembly, a body portion formed with axially extending through holes 17, 17, 18, 18, 19, 19, and 19a. The holes 17 and 18, nearest the front and rear ends of the base member, and the hole 19a, at its middle, provide cooling ventilation. The two holes 19, 19, near the middle of the base member, are of triangular shape, with one side of the triangle tangentially disposed, and each of those holes is open to the outer face of the base member through a large hole 20 cut through the outer one of the three walls defining the triangular hole 19. Each hole 20 extends throughout only the middle part of the said wall, as shown clearly in FIGS. 5 and 6, and its front and rear walls are respective extensions of the oblique plane faces 20a, 20a of the two other hole-defining walls, as will be clear from inspection of FIG. 1 at the position of the section line 5—5, and FIG. 6.

The adjacent rubber wall of the diaphragm 12, elsewhere fitting against the cylindrical areas of the base member's outer face, is integrally formed with a triangular rubber driving lug 21, FIGS. 1 and 5, which fits against the said oblique plane faces 20a, 20a and their said extensions, for interlock driving engagement with the shoe-base member. However, each lug 21 preferably has clearance from the end walls of the hole 20 and from the wall at the radially inner apex of the triangular hole 19, for ease of mounting and removal, the lug 21 being primarily a torque-sustaining element.

At each of its forward and rear ends the shoe-base member 13 is formed at its corners with attachment ears 22, 22 projecting radially outward and formed with bolt holes. Between each pair of ears the shoe-base member is formed with an oblique outer face area 23, FIGS. 1 and 6, and the diaphragm is formed with complemental driving-interlock lugs 24, 24 having faces to fit against the said oblique face areas 23 respectively.

Each lug 24 is formed with an axially disposed through hole for a headed bolt or pin 25 which extends through the lug and through the apertured ears 22 of the shoe-base member for securing the shoe assembly to the diaphragm to maintain their interlocked relationship and assure radial movement of the shoe assemblies toward and from the drum 10 in response to inflation and deflation of the hollow diaphragm.

In the constricting-type clutch here shown retracting springs are not required, the resilience of the diaphragm being sufficient to assure retraction of the shoes, and centrifugal force also being a factor.

For retaining the pins 25 in place their projecting, non-headed ends are apertured and a wire 26, serving in the manner of cotter pins, extends through the holes in the two pins of each shoe assembly and have bent ends beyond the respective pins for retaining the cotter wire in place. The middle part of the wire 26 preferably has a bent out arch portion 26a to avoid obstruction of ventilating air passing through the hole 19a.

As will be seen clearly in FIGS. 1, 2 and 3, each lug 24 is a little shorter than the space between the attachment ears 22, 22 and at the positions between shoe assemblies the diaphragm wall 12a is recessed, as at 12b, FIG. 1, to accommodate the attachment ears 22, while permitting elsewhere extensive face-to-face contact of the diaphragm with the shoe-base member.

Each end face of each shoe-base member 13 is formed with a groove 27 extending axially throughout the width of the said member. Between each base member and the next, and bridging the space between them, is a single-leaf spring 28, FIGS. 1 and 2, with its margins in the grooves 27, 27 of the adjacent shoe-base members. For retention of the spring 28 in place it is of slightly arched shape, as shown clearly in FIG. 2, so that its middle part resiliently bears against the radially outer walls of the grooves 27, 27 and its end portions resiliently bear against the margins of the two adjacent plate-like elements 16, 16 of the shoe-base members, and each end of the spring is bent, as at 28a, 28a, to interlock with the edges of the said elements.

The spring can easily be mounted, in stressed condition, by passing it lengthwise into place, with flexing of it.

The grooves 27 are sufficiently deep to permit the shoe assemblies to have their closest approach to one another, in the engagement of the clutch, without being stopped by the spring.

The plate-like element 16 of each shoe-base member preferably projects, axially of the assembly, from each side of the main body of the said member, so that the total width of the said element is substantially the same as that of the diaphragm 12, to provide a good spark barrier or deflector and to permit the use of a bridge spring long enough to be easily flexed in being mounted or removed, the bridge spring also serving as a spark barrier or deflector throughout the axial extent of the space between adjacent shoe-base members, as can be clearly visualized with reference to FIG. 2.

The shoe-base members can be economically formed in quantity production by extruding aluminum alloy or the like as a continuous strip, cutting the strip into individual lengths, and by simple known procedure machining each length to its final shape, or with reversal of the order of the two last mentioned operations.

Modifications are possible without departure from the scope of the invention as defined in the appended claim.

I claim:

In a friction clutch or brake assembly, the combination of an inflatable fluid-distensible hollow annular diaphragm of rubber-like material, a plurality of wear shoe plates spaced apart in succession circumferentially at the radially inward side of said diaphragm, each of said wear shoe plates being coupled to said diaphragm to move radially with the diaphragm as the latter is inflated and deflated, a plurality of friction members mounted on the wear shoe plates at the radially inward side thereof, the successive wear shoe plates having axial grooves therein facing toward one another at the neighboring circumferential ends of the wear shoe plates, each of said grooves being open at each axial end of the respective wear shoe plate and being defined by a pair of radially spaced surfaces of the respective wear shoe plate, and a plurality of flexible and resilient leaf springs engaged respectively between the successive wear shoe plates, each of said leaf springs being received in said grooves in two successive wear shoe plates and bridging the circumferential space between said two wear shoe plates, each leaf spring between its opposite ends axially of the assembly being arched radially outward and bearing resiliently against the radially outward groove surfaces on the respective wear shoe plates, each end of each leaf spring being turned in radially and projecting beyond and bearing resiliently against the adjacent axial end edges of the respective wear shoe plates, said wear shoe plates constituting the sole means of support for the leaf springs, each of said wear shoe plates throughout its extent circumferentially of the assembly having an axial extent at least as great as that of the diaphragm, each of said leaf springs having an axial extent at least as great as that of the diaphragm, and each of said leaf springs being slidably insertable axially into the respective wear shoe plate grooves by flexure of the leaf spring opposite to its curvature.

References Cited in the file of this patent

UNITED STATES PATENTS

| | | |
|---|---|---|
| 2,350,038 | Hollerith | May 30, 1944 |
| 2,388,151 | Hunter | Oct. 30, 1945 |
| 2,418,099 | Schmitter et al. | Mar. 25, 1947 |
| 2,662,625 | Fawick | Dec. 15, 1953 |
| 2,720,288 | Keller | Oct. 11, 1955 |

FOREIGN PATENTS

| | | |
|---|---|---|
| 576,904 | Great Britain | Apr. 25, 1946 |
| 683,671 | Great Britain | Dec. 3, 1952 |